United States Patent [19]

DiSimone

[11] Patent Number: 4,811,875
[45] Date of Patent: Mar. 14, 1989

[54] PORTABLE AUTOMOTIVE BENCH

[76] Inventor: Robert P. DiSimone, 1263 Shadow Oak Dr., Malvern, Pa. 19355

[21] Appl. No.: 172,488

[22] Filed: Mar. 24, 1988

[51] Int. Cl.$^4$ .................. B60R 11/06; A47B 3/06; A47B 37/00
[52] U.S. Cl. .................. 224/42.44; 108/44; 108/137; 108/158; 312/330 R
[58] Field of Search ............... 224/42.44, 42.08, 42.11; 312/250, 251, 256, 330 R, 286; 248/149; 108/1, 6, 44, 137, 143, 153, 158, 47, 50, 38, 157; 280/727

[56] References Cited

U.S. PATENT DOCUMENTS

| | | | |
|---|---|---|---|
| 1,723,238 | 8/1929 | Hoot | 108/44 |
| 1,830,347 | 11/1931 | Camden et al. | 108/137 |
| 2,702,225 | 2/1955 | Hawkins | 312/330 R X |
| 2,805,778 | 9/1957 | Yordi | 108/44 |
| 2,818,316 | 12/1957 | D'Andrade | 220/18 |
| 2,901,303 | 8/1959 | Anderson | 108/44 |
| 2,958,566 | 11/1960 | Buck | 108/44 |
| 3,015,530 | 1/1962 | Anderson | 211/88 |
| 3,023,063 | 2/2962 | Hansen | 108/44 |
| 3,026,159 | 3/1962 | Miller et al. | 108/1 |
| 3,295,470 | 1/1967 | Johnson | 108/47 |
| 3,394,666 | 7/1968 | Pearlman | 108/44 X |
| 3,401,650 | 9/1968 | Terezas | 108/50 X |
| 3,698,330 | 10/1972 | Krombach | 108/44 |
| 3,975,068 | 8/1976 | Speckin | 312/330 R X |

Primary Examiner—Harvey C. Hornsby
Assistant Examiner—Scott J. Haughland
Attorney, Agent, or Firm—Francis A. Varallo

[57] ABSTRACT

The present disclosure describes a portable bench which finds particular application in the automotive field. The bench is comprised of a main body for supporting a pair of opposed drawers in sliding relationship to one another. When the drawers are in a closed position, they are concealed within the main body. A support assembly is removably attached to the front of each of the drawers. In use, the bench is oriented at a right angle to the longitudinal axis of the vehicle. The drawers are slid outward from the main body to permit the support assemblies to engage the respective opposite fenders of the vehicle. Tools, parts and related materials may be rested upon the main body which can be slid from one extremity of the bench to the other. Items placed in the drawers during use of the bench may be temporarily stored therein when the bench is removed from the vehicle and the drawers closed.

19 Claims, 5 Drawing Sheets

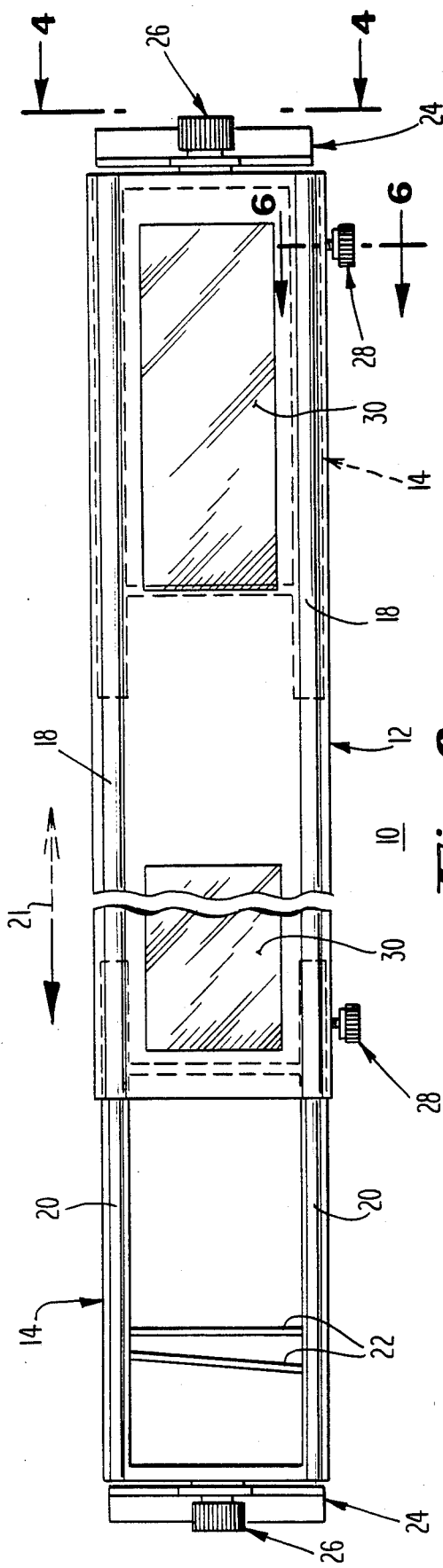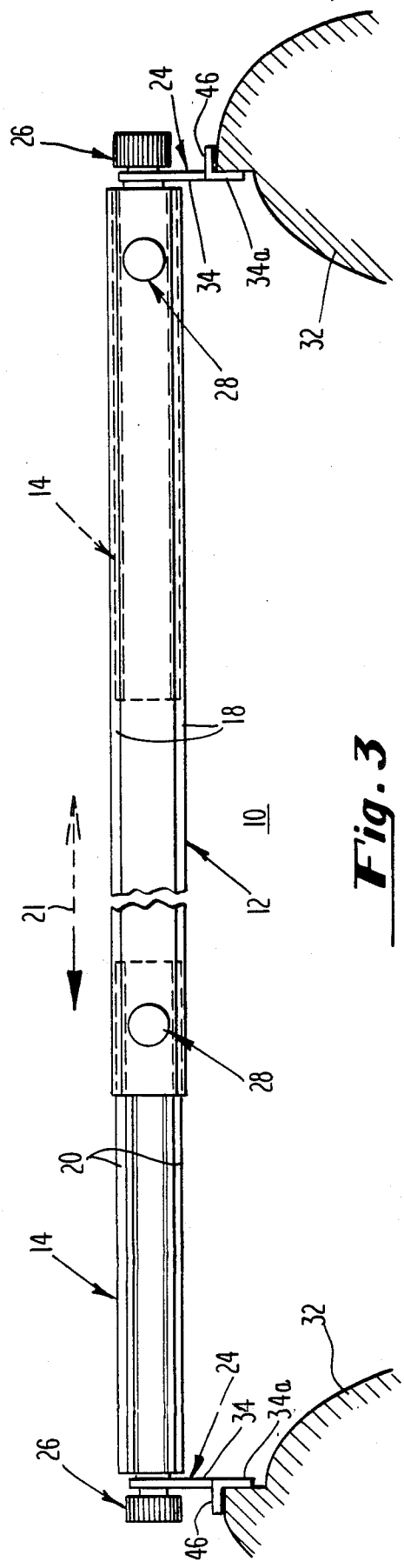

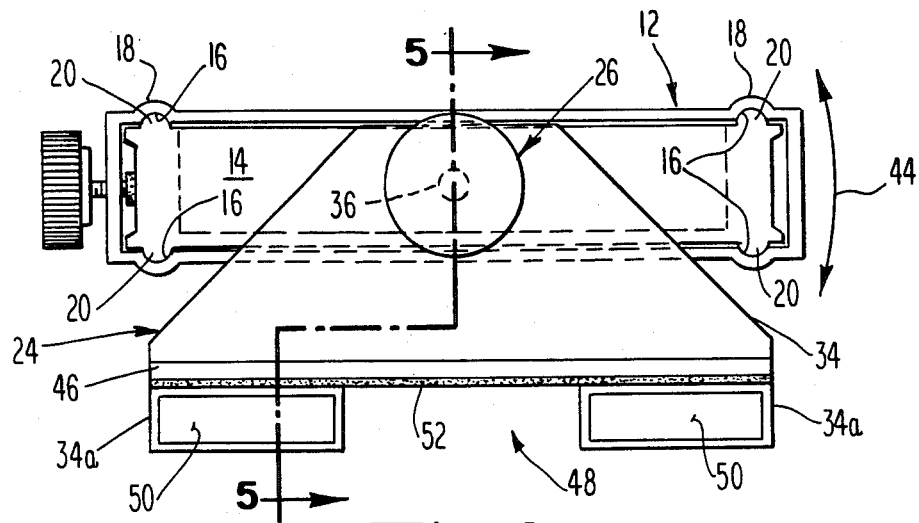
_Fig. 4_
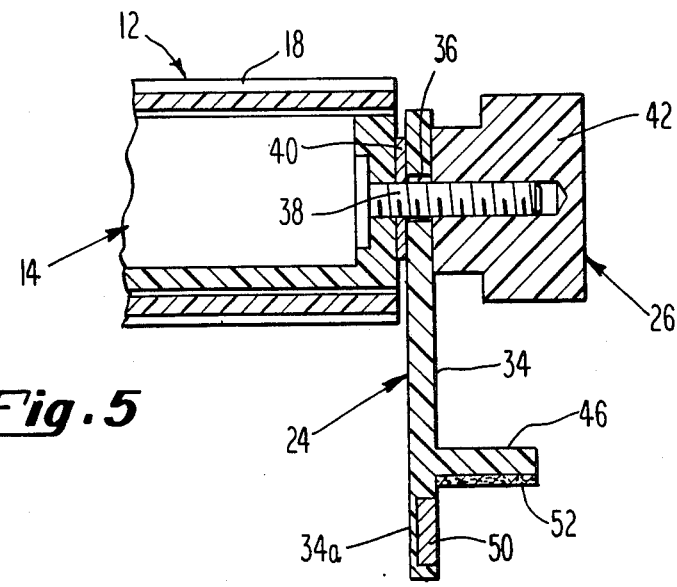
_Fig. 5_
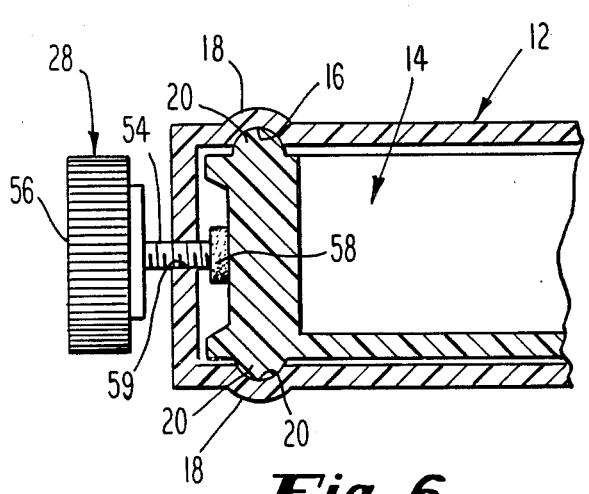
_Fig. 6_
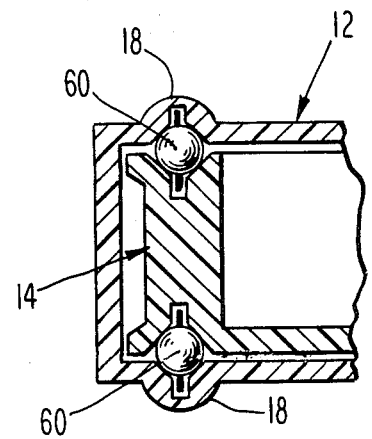
_Fig. 7_

U.S. Patent    Mar. 14, 1989    Sheet 5 of 5    4,811,875
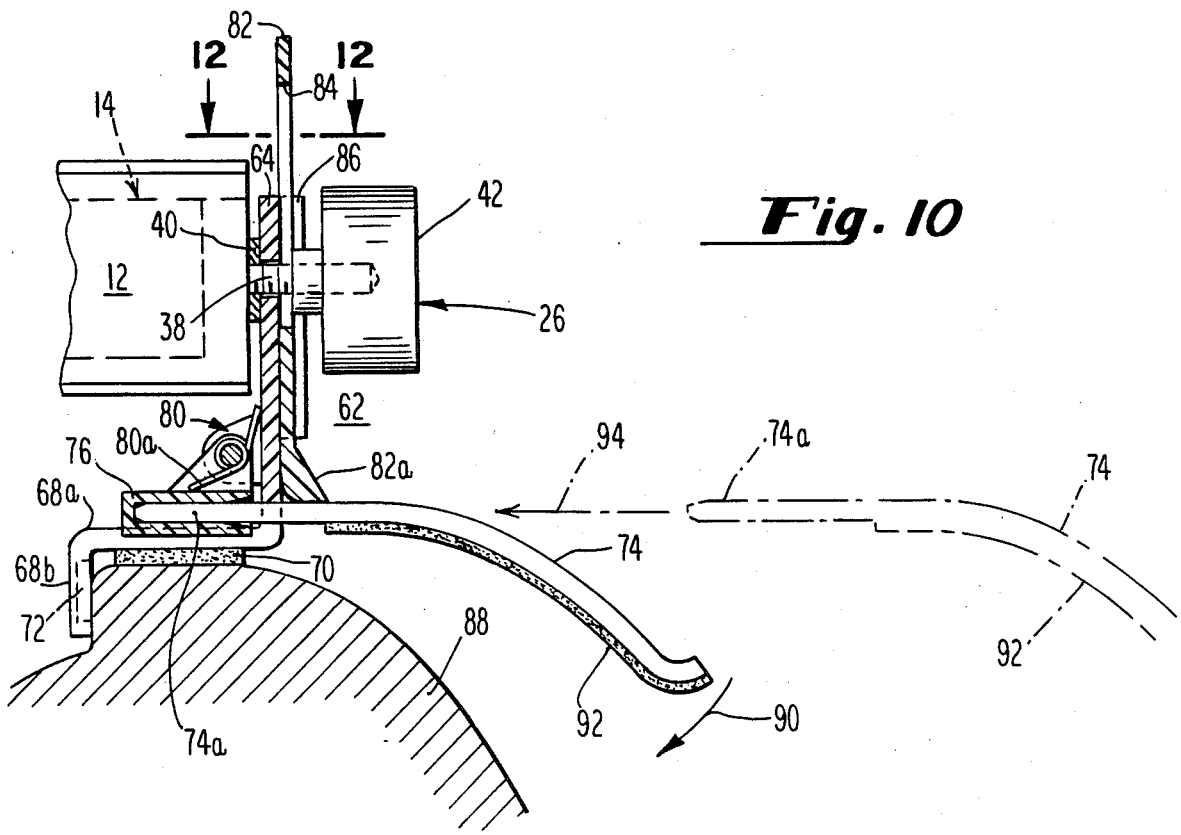
Fig. 10
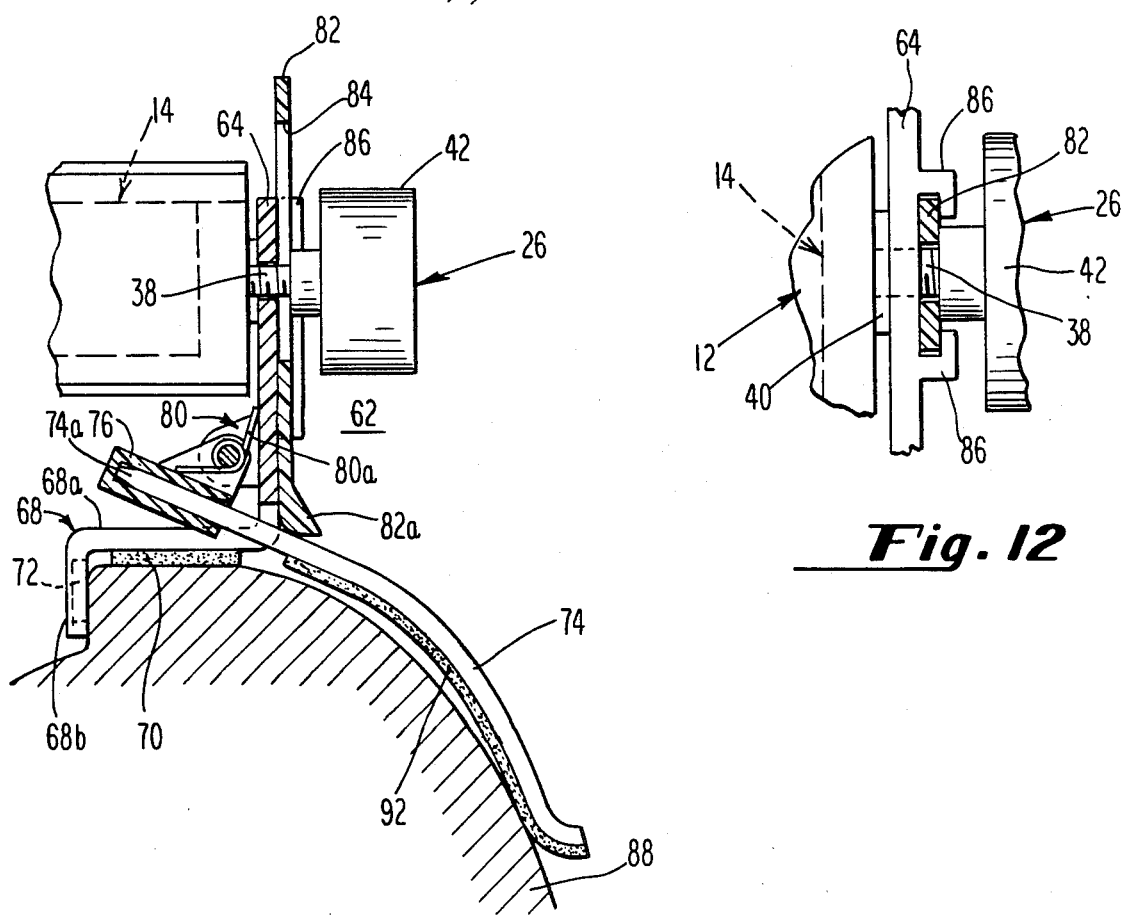
Fig. 11
Fig. 12

PORTABLE AUTOMOTIVE BENCH

BACKGROUND OF THE INVENTION

The complexity of present day automotive engines and their ancillary components has resulted in increased difficulties for mechanics who are effecting repairs or making adjustments. In order to perform such operations, a variety of hand tools must typically be employed. Moreover, as the work progresses, a considerable number of small parts may have to be removed and it is essential that these parts be retained by the mechanic and be readily retrievable for reinstallation. New parts may be needed to replace defective ones and these should also be conveniently accessible to the mechanic at the work area.

A cursory observation of the surfaces present within the engine compartment or the adjacent fender structures reveals that none are truly suited for resting tools and small parts. In fact, although the top of the air cleaner housing or the radiator baffle are sometimes called upon to serve this purpose, they are grossly inadequate. It is not uncommon for tools and parts to be unknowingly dislodged from these surfaces during repairs and to be lost within the engine compartment or dropped to the ground beneath the vehicle. Another problem faced by the mechanic stems from situations such as the unavailability of a replacement part, which precludes the immediate completion of the job. In this case, the mechanic, prior to starting a new job, must carefully store all the parts he has accumulated in a safe place, such as his work bench or tool box, being careful not to intermix them with other parts which he may have on hand.

In order to make present day automotive repairs less tedious and time consuming, what is needed is a portable bench which may be easily installed by a mechanic over the engine compartment prior to starting the repair job. Such a bench should advantageously provide means for resting tools, parts, nuts, bolts and other related materials prior to and during the repair of items such as water pumps, timing chains, alternators, power steering pumps, and carburetors. Additionally, the bench should be readily removable from the engine compartment and should provide temporary storage of parts, without the danger of their loss, when the completion of a job must be postponed. The automotive bench of the present invention fills such a need.

SUMMARY OF THE INVENTION

In accordance with the present invention, there is provided a compact, easily installed automotive bench which is universally adaptable to the engine compartment of vehicles of different size and design.

The automotive bench is comprised of a substantially planar, elongated, main body for supporting a pair of opposed drawers in sliding relationship to one another. The dimensions of the bench are chosen such that when the drawers are in a closed position, they are concealed within the main body. A support assembly is removably attached to the front of each of the drawers by a locking-knob assembly.

In use, the hood of the vehicle is raised and the bench is oriented at a right angle to the longitudinal axis of the vehicle. Either one or both of the drawers, as desired or required by the transverse distance across the engine compartment, are slid outward from the main body to permit the support assemblies to engage the respective opposite fenders of the vehicle.

The invention contemplates the use of a basic support assembly for application on many vehicles, and a universal support assembly of somewhat more complex design for use with substantially all vehicles. Both support assemblies are attached to the fronts of the drawers in the same manner and both include an angle section at one extremity thereof. The horizontal portion of the angle section rests upon the top of the fender, while the vertical portion engages the vertical edge of the fender normally abutting the hood when the latter is closed. A magnet disposed in the vertical section contacts the metallic fender and serves to retain the bench in place. The universal support assembly includes additional means for engaging the fender and is particularly useful where the fender is of nonmetallic material such as fiber glass or nonmagnetic, as stainless steel. A contoured, spring-loaded, fender-gripping arm is included in the universal support assembly. In operation, after the angle section has been placed into contact with the fender, the arm is pivoted into contact with the contoured portion of the fender. Locking means included within the assembly retain the arm in contact with the fender and the bench in position.

The contoured arm of the universal support assembly is releasably attached, and the invention contemplates the use of a set of such arms having different contours and dimensions to accommodate varying fender configurations. The locking-knob assembly permits the bench to be oriented at a desired angular position regardless of the slope of the fenders or the pitch of the vehicle.

During the use of the bench, small parts, tools and the like may be placed on the upper surface of the main body or in the drawers, and the main body may be slid from one extremity of the bench to the other, thereby exposing all or a portion of the contents in either of the drawers as desired. When the bench is removed from the vehicle, parts remaining in the drawers will be retained therein when the drawers are closed.

Other features and advantages of the present invention will become apparent in the detailed description which follows.

BRIEF DESCRIPTION OF THE DRAWING

FIG. 2 is a plan view of the bench of FIG. 1 illustrating the opposed drawers in respective open and closed positions relative to the main body.

FIG. 3 is a front view of the bench shown in an operative condition, traversing the engine compartment, and supported on opposite fenders.

FIG. 4 is a side view of the bench taken along the lines 4—4 of FIG. 2 and illustrating the basic support assembly.

FIG. 5 is a section view taken along lines 5—5 of FIG. 4 and illustrating the mounting of the support assembly on the front of a drawer, by the locking-knob assembly.

FIG. 6 is an enlarged section view taken along lines 6—6 of FIG. 2 and showing details of one of the pair of stop knobs mounted on the main body.

FIG. 7 illustrates the use of ball bearing glides as an alternative to the surface-to-surface glides illustrated in the remaining figures.

FIG. 10 illustrates the attachment of the support assembly of FIGS. 8 and 9 to the drawer and the disposition of the assembly on the vehicle fender prior to locking the support in position.

FIG. 11 shows the support assembly of FIG. 10 locked into engagement with the vehicle fender.

FIG. 12 is a view taken along lines 12—12 of FIG. 10 further detailing the orientation of a locking lever in the universal support assembly.

DESCRIPTION OF THE PREFERRED EMBODIMENTS

Figure 1:
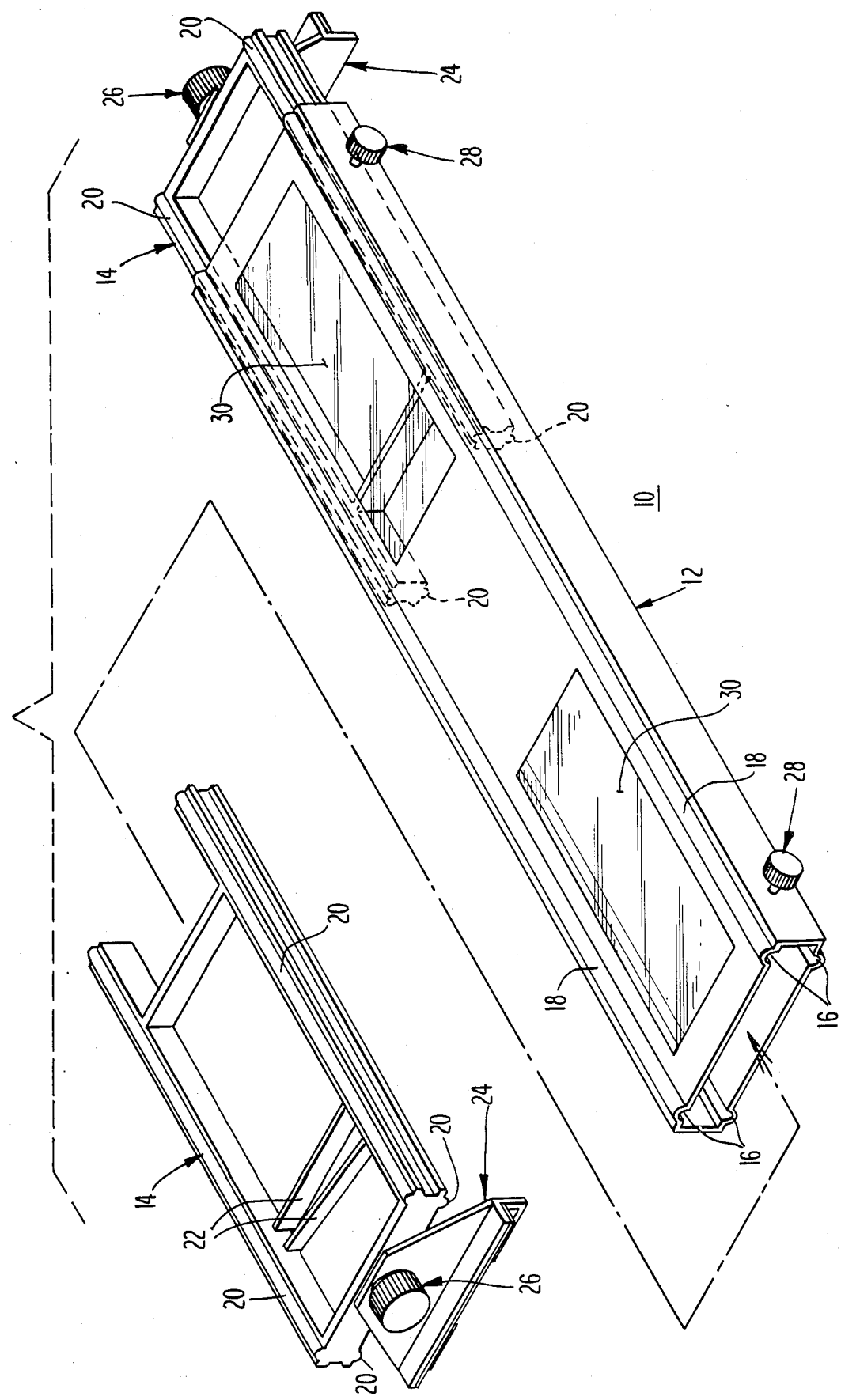
FIG. 1 is an exploded pictorial view of the automotive bench of the present invention.

FIGS. 1 and 2 illustrate in pictorial fashion the automotive bench 10 of the present invention. The bench is comprised of a main body 12 capable of receiving and supporting a pair of opposed drawers 14. The main body 12 is generally rectangular in cross section and includes internal concave glide channels 16. The channels 16 are formed in the upper and lower planar surfaces of the main body adjacent the corners thereof and traversing its length. The channels 16 form a narrow, raised rib section 18 on opposite sides of the external, upper and lower body surfaces. With respect to the upper body surface, the rib 18 serves to retain the small items rested upon the surface.

The drawers 14 each have pairs of longitudinal side glides 20 having a complementary convex structure to that of the channels 16 in the main body 12. The drawers 14 may be disposed within the main body, where they are supported, as seen particularly in FIG. 2, in sliding relationship with one another, as indicated by arrows 21. The drawers 14 may include dividers 22, angled for example, to accommodate a range of automotive sockets (not shown). A basic support assembly 24 is shown attached to the front of each drawer 14 by a locking-knob assembly 26. The basic support assemblies are designed to contact the fenders of the vehicle and to retain the bench in place, as will be described in detail hereinafter.

The main body 12 includes a pair of stop knobs 28 which when actuated, prevent relative movement of the body 12 and the drawers 14 when the bench is in use. The main body also includes windows 30 in the upper surface to provide visual inspection of the contents of the drawers 14.

In FIG. 3, the automotive bench 10 of FIG. 2 is shown traversing a vehicle engine compartment (not illustrated) and supported on opposite fenders 32 by the basic support assemblies 24. start here The design of the basic support assembly 24 is shown in greater detail in FIGS. 4 and 5. Thus, the basic support assembly 24 is comprised of a generally planar, truncated triangular body member 34 having an aperture 36 adjacent the narrow portion thereof. The basic support assembly 24 is attached to the front of a drawer 14 by a locking-knob assembly 26, as best seen in FIG. 5. The latter assembly is comprised of a screw 38 centrally mounted within the drawer 14 and protruding from the front thereof. The assembly further includes a washer 40 and a threaded knob 42. In attaching the support assembly 24 to the drawer 14, the screw 38 passes via washer 40, through aperture 36, into knob 42, which when actuated bears against the assembly and locks it into place. It should be noted that as indicated by arrows 44 in FIG. 4, the bench 10 is pivotally mounted by way of the support assembly 24 to provide a desired angular relationship of the bench 10 to the fenders 32.

With continued reference to FIGS. 4 and 5, the body member 34 of the basic support assembly 24 includes at one extremity thereof, a ledge 46 which traverses member 34 and forms inverted "L" sections with coplanar portion 34a of member 34. The ledge 46, which is the horizontal section of the "L" rests upon the top of the fender 32, while the vertical portion 34a of the "L" engages the vertical edge of the fender normally abutting the hood when the latter is closed. The vertical portion 34a provides two spaced-apart sections. The space 48 therebetween accommodates items within the engine compartment, such as the rubber hood bumpers (not shown), to allow for more convenient placement of the bench. A magnet 50 is disposed in each of the vertical sections 34a to contact the metallic fender 32 and to retain the bench 10 in place. A strip of resilient material 52 is affixed to the ledge 46 to prevent scratching of the fender surface.

FIG. 6 is an enlarged view of one of the pair of stop knobs 28 illustrated for example in FIG. 1. The stop knobs 28 include a screw 54 having at one extremity thereof a knob 56 and a high-friction disk 58 at its opposite extremity. The screw 54 is mounted in a threaded aperture 59 in the front wall of the main body 12. Rotation of the knob 56 in a direction to move the disk 58 into contact with the side of the drawer 14, prevents relative movement of the drawer 14 and the main body. As will be described hereinafter the stop knobs 28 are utilized during the operation of the bench 10.

The glides 16 and 20 shown in FIGS. 1–6 are assumed to be made of low friction material such that the drawers 14 and the main body 12 may be easily slid back and forth with respect with one another. If desired however, as seen in FIG. 7, ball bearings 60 may be utilized in the glides.

Figure 8:
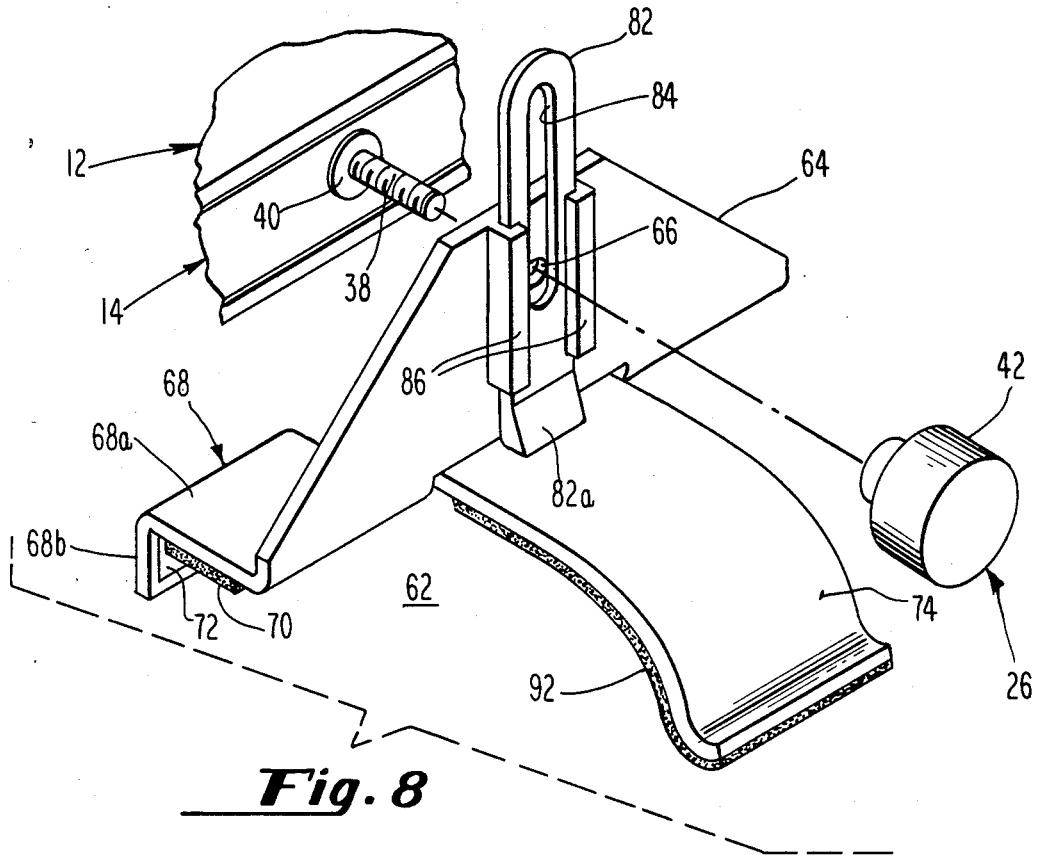
FIG. 8 is an exploded pictorial view illustrating one side of a universal support assembly for attachment to the front of a drawer.
Figure 9:
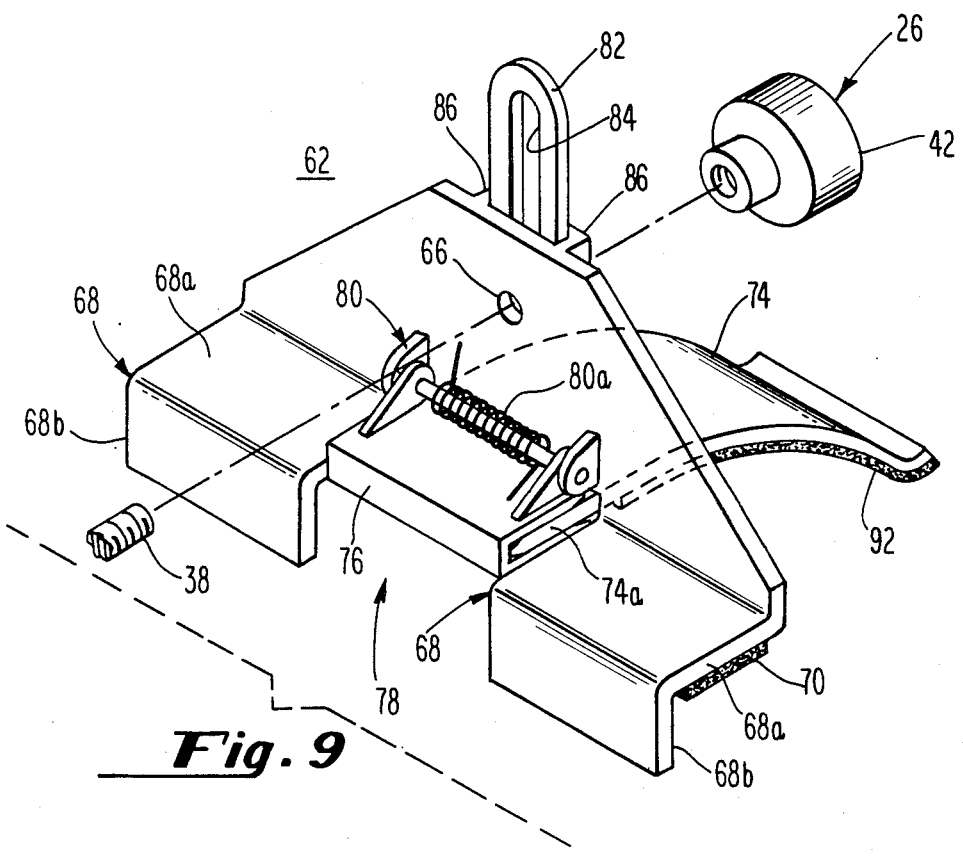
FIG. 9 is an exploded pictorial view of the opposite side of the support assembly of FIG. 8.

With reference to FIGS. 8 and 9, there is illustrated in pictorial fashion opposite sides of a universal support assembly 62 which may be directly substituted for the basic support assembly 24 described hereinbefore. As in the latter assembly, the universal support assembly 62 includes a generally planar body member 64 having an aperture 66 adjacent one extremity thereof for permitting its attachment to the front of drawer 14 by the locking-knob assembly 26. The opposite extremity of body member 64 is formed into a pair of spaced-apart inverted "L" sections 68. The horizontal legs 68a of the "L" project at right angles from the body member 64 and terminate in respective vertical legs 68b which lie in a plane parallel to, but spaced apart from the body member 64. As in the basic support assembly 24 a protective pad 70 is affixed to the underside of the horizontal legs 68a, and magnetic elements 72 are disposed within the vertical legs 68b.

A contoured, fender-gripping arm 74 is provided. A narrow box-like receptacle 76, open at least at one extremity, is disposed within the space 78 between the "L" sections 68, and is attached to the body member 64 by a hinge assembly 80 which is spring loaded by coil spring 80a. The arm 74 is formed with a straight section 74a at one extremity thereof which permits its insertion into the receptacle 76. A lever 82 having an elongated slot 84 is slidably mounted within grooved members 86 disposed on the side of the body member 64 opposite to that on which the hinge assembly 80 is mounted. The lever 82 includes a foot 82a which contacts the outer surface of arm 74. The lever performs a locking function which will be described hereinafter in connection with the operation of the bench.

In use, with reference to FIGS. 1-3, the hood of the vehicle is raised, and the bench 10 is oriented across the engine compartment. Assuming that the drawers 14 are closed and locked within the main body 12, the stop knobs 28 are turned outward to permit the drawers 14 to be opened. If the bench 10 is fitted with the basic support assembly 24, as seen in FIG. 3, the horizontal ledge 46 is placed upon the top of the fender 32 while the vertical sections 34a abut the vertical side of the fender. The locking-knob assembly 26 is loosened to permit the bench to be oriented in a desired angular position (arrows 44, FIG. 4), and then tightened to retain that position. The magnets 50 disposed within the vertical portions 34a as best seen in FIGS. 4 and 5, exert a force on the metallic fender 32 and keep the bench 10 in position while the main body 12 is positioned with respect to the drawers 14. Thereafter, the stop knobs 28 are turned inward to prevent any further motion, at least for the time being, between the main body 12 and the drawers 14. As the work progresses, access to the drawers 14 may be had by releasing the stop knobs 28, moving the main body 12 to any desired position along the bench 10, and then tightening the knobs.

It is apparent from the foregoing that the magnets 50 play an important role in maintaining the bench in position, while the stop knobs 28 are released and the main body 12 is slid back and forth. It is recognized that the majority of the vehicles on which the bench will be used are made with metallic fenders, and the basic support assembly 24 is well suited for such applications.

On the other hand, if the bench 10 is fitted with the universal support assembly 62 depicted in FIGS. 8 and 9, the bench 10 may be used with all types of fenders, whether made of magnetic, nonmagnetic, or nonmetallic material. The initial orientation of the bench, so fitted, is the same as that described hereinbefore. FIG. 10 shows the universal support assembly 62 attached to the front of a drawer 14 by the locking-knob assembly 26. The screw 38 of the last mentioned assembly passes through the aperture 66 in the body member 64, through slot 84 of lever 82, into knob 42. With continued reference to FIG. 10, after the angle sections 68 have been disposed on the fender 88, the knob 42 is loosened, and the arm 74 is pivoted downward in the direction of arrow 90, until the protective material 92 on its underside contacts the fender. As seen in FIG. 11, when arm 74 is pivoted downward, lever 82 slides downward by gravity thereby keeping its foot 82a in contact with the outer surface of the arm 74. The knob 42 is then tightened as seen in FIG. 12, thereby locking both the arm 74 against the fender via lever 82 and the bench 10 in a desired angular orientation.

Since the arm 74, also shown in phantom in FIG. 10, is easily inserted in the direction of the arrow 94 and readily removed from the receptacle 76, a set of such arms having different contours and dimensions may be provided to accommodate the fender configurations of a variety of vehicles. If desired, the universal support assembly 62 may be utilized without arm 74, in those situations where the fenders are made of magnetic material and the additional gripping force of the arm is not needed In conclusion, there has been disclosed a bench for resting small items during repair or adjustment operations. The portability of the bench, its compactness, its ability to provide temporary storage for small items, and its universality make it especially attractive for use in the automotive field. It is apparent that changes and modifications in the bench which are within the skill of the mechanical designer, may be required to suit particular applications. For example, as described hereinbefore, the bench may be constructed of plastic-type materials, such as Fiberglass, to provide strength with minimum weight. Other materials may be utilized. Moreover, illumination means may be attached to the underside of the bench. Such changes and modifications, in so far as they are not departures from the true scope of the invention, are intended to be covered by the claims which follow.

What is claimed is:

1. A portable bench for resting small items comprising in combination:

a main body member having opposed extremities which are open and having internal glides traversing its length, a pair of drawers having external longitudinally disposed glides complementary in structure and homologously arranged with respect to said gliders of said main body member, said pair of drawers being inserted within said main body member at respective opposed extremities thereof and being retained therein in sliding relationship with each other, support means directly attached to the front of each of said drawers for supporting said bench in an operative position, and locking means for attaching said support means to said drawers.

2. A portable bench as defined in claim 1 characterized in that said locking means permits said bench to be pivotally mounted with respect to said support means.

3. A portable bench as defined in claim 2 further characterized in that the dimensions of said bench are such that when said drawers are in a closed position, they are concealed within said main body member.

4. A portable automotive bench for traversing the engine compartment of a vehicle having its hood raised and for engaging opposite fenders of said vehicle adjacent said compartment comprising:

a main body member having opposed extremities which are open and having internal glides traversing its length, a pair of drawers having external longitudinally disposed glides complementary in structure and homologously arranged with respect to said glides of said main body member, said pair of drawers being inserted within said main body member at respective opposed extremities thereof and being retained therein in sliding relationship with each other, a pair of support assemblies directly attached respectively to said pair of drawers, each of said support assemblies including a substantially planar body having an aperture at one extremity thereof and an angle section at its opposite extremity, said angle section being formed by a horizontal portion and an adjacent vertical portion, at least one of said drawers being slid outward from said main body member to permit the horizontal portions of the angle sections to rest upon the respective tops of said fenders and the vertical portions of the angle sections to contact the vertical parts of said fenders which normally abut said hood when the latter is in a closed position, and, means for attaching said support assemblies to said drawers.

5. A portable automotive bench as defined in claim 4 wherein said means for attaching said support assemblies to said drawers include a pair of locking-knob assemblies, each of said locking-knob assemblies being comprised of a screw centrally mounted within a drawer and protruding from the front surface thereof, a washer disposed in contact with said front surface, and a threaded knob.

6. A portable automotive bench as defined in claim 5 characterized in that said horizontal portion in each of said support assemblies traverses said body at right angles thereto and said vertical portion is coplanar with said body.

7. A portable automotive bench as defined in claim 6 wherein said vertical portion of said angle section is comprised of a pair of spaced-apart vertical sections, the space between said vertical sections providing a relief for possible obstructions adjacent said engine compartment which might interfere with the desired placement of said bench.

8. A portable automotive bench as defined in claim 7 wherein said body of each of said support assemblies is disposed via said aperture between said washer in contact with the front surface of said drawer and said threaded knob, said bench being capable of being oriented with respect to the horizontal when said knob is loosened, and to be locked into position when said knob is tightened.

9. A portable automotive bench as defined in claim 8 wherein each of said vertical sections includes a magnet disposed therein for exerting a magnetic force on the vertical part of the fender with which it is in contact, thereby tending to retain said bench in its operative position.

10. A portable automotive bench as defined in claim 9 further including a strip of resilient material affixed to the underside of said horizontal portion to prevent the scratching of the fender surface.

11. A portable automotive bench as defined in claim 5 characterized in that said angle section of each of said support assemblies is comprised of a pair of spaced-apart inverted "L" sections, the horizontal portion of each of said "L" sections projecting at right angles from said body and terminating in a vertical section which lies in a plane parallel to but spaced apart from the plane of said body.

12. A portable automotive bench as defined in claim 11 wherein each vertical section includes a magnet disposed therein.

13. A portable automotive bench as defined in claim 12 further including a contoured, fender-gripping arm, a narrow box-like receptacle open at least at one extremity thereof and disposed within the space between said "L" sections, said receptacle being affixed to said body by a spring-loaded hinged assembly, said arm having a straight section at one extremity thereof for insertion into said receptacle, said arm being rotatable via said hinge assembly into contact with said fender, a pair of grooved members disposed on the side of said body opposite to that on which said hinge assembly is affixed, a lever having an elongated slot in coincidence with said aperture in said body, said lever being slidably mounted within said grooved members, said lever further including at one extremity thereof a foot which contacts the outer surface of said arm.

14. A portable automotive bench as defined in claim 13 wherein said body of each of said support assemblies is disposed via said aperture and said slot in said lever between said washer in contact with said front surface of said drawer and said knob, said bench being capable of being oriented with respect to the horizontal and said arm being capable of being rotated into contact with said fender when said knob is loosened, said lever sliding downward by gravity to maintain said foot in contact with said arm, said bench and said arm being locked into position when said knob is tightened.

15. A portable automotive bench as defined in claim 14 wherein said main body member is an elongated box-like structure, having a generally rectangular cross section, said internal glides being comprised of concave channels formed in the internal upper and lower planar surfaces of said main body member adjacent the corners thereof, said drawers each having pairs of said glides on opposite sides thereof, said last mentioned glides having a complementary convex structure to that of said channels in said main body.

16. A portable automotive bench as defined in claim 15 wherein said channels formed in said upper planar surface of said main body member produce narrow, raised ribbed sections on opposite sides of the external upper planar surface.

17. A portable automotive bench as defined in claim 16 further including a pair of stop knobs mounted in spaced-apart locations in said main body member, each of said stop knobs being comprised of a screw having a knob at one extremity thereof and a high-friction disk at its opposite extremity, said knob being rotatable to move said disk into contact with a drawer disposed within said main body member, thereby preventing relative motion of said drawer and said main body member.

18. A portable automotive bench as defined in claim 17 further including windows in the upper surface of said main body member to provide visual inspection of the contents of said drawers.

19. A portable automotive bench as defined in claim 18 wherein said glides of said main body member and said drawers include ball bearings.

* * * * *